United States Patent [19]

Rowe

[11] 4,128,332
[45] Dec. 5, 1978

[54] ILLUMINATOR

[75] Inventor: Stephen H. Rowe, Harpenden, England

[73] Assignee: Xerox Corporation, Stamford, Conn.

[21] Appl. No.: 656,559

[22] Filed: Feb. 9, 1976

[30] Foreign Application Priority Data

Mar. 24, 1975 [GB] United Kingdom ............ 12173/75

[51] Int. Cl.² ............................................. G03B 27/54
[52] U.S. Cl. ........................................ 355/67; 355/1;
355/70; 355/84; 362/32; 350/96.10
[58] Field of Search ............................ 240/1 LP, 1 EL;
350/96 R; 355/1, 8, 67, 70, 71, 84; 362/31, 32

[56] References Cited

U.S. PATENT DOCUMENTS

| 2,574,292 | 11/1951 | Rush | 240/1 EL |
|---|---|---|---|
| 3,023,304 | 2/1962 | Peterson | 240/1 EL |
| 3,125,013 | 3/1964 | Herrick et al. | 240/1 LP |
| 3,131,496 | 5/1964 | Schropp | 240/1 EL |
| 3,194,142 | 7/1965 | Black | 355/1 |
| 3,356,839 | 12/1965 | Mehess et al. | 240/1 EL |
| 3,497,981 | 3/1970 | Tyne | 240/1 LP |
| 3,752,974 | 8/1973 | Baker | 240/1 EL |
| 3,968,584 | 7/1976 | Kingston | 24/1 EL |

*Primary Examiner*—L. T. Hix
*Assistant Examiner*—Alan Mathews

[57] ABSTRACT

An illuminator including an internally reflecting light conduit and a light source to illuminate at least one of its ends. The longitudinal surface of the light conduit has a coating arranged in desired geometry to allow the escape of light from the conduit in accordance with the geometry to illuminate an object as desired. The coatings disclosed are a diffuse material to scatter light internally of the conduit, and a transparent material of refractive index greater than that of the conduit.

2 Claims, 5 Drawing Figures

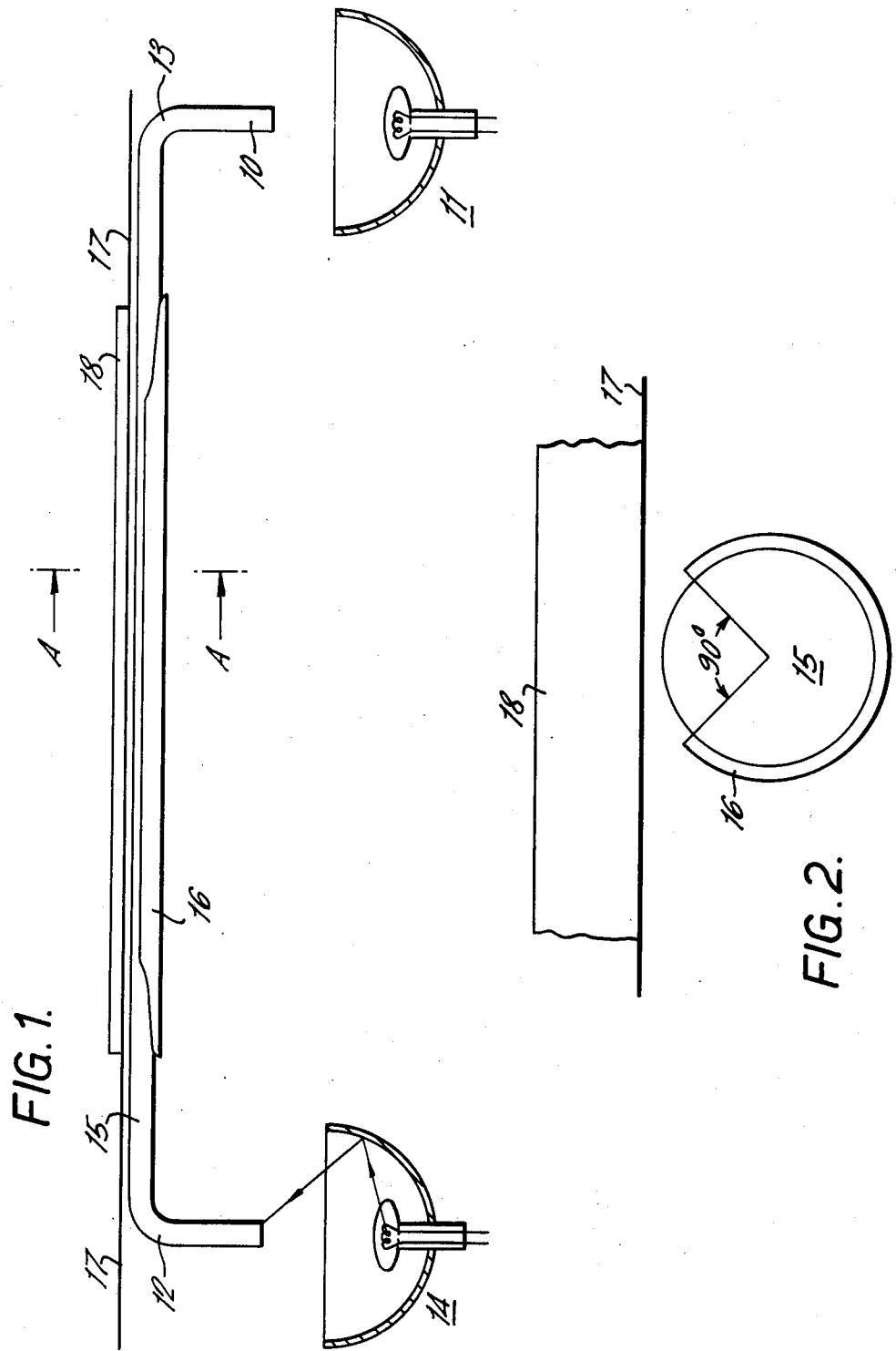

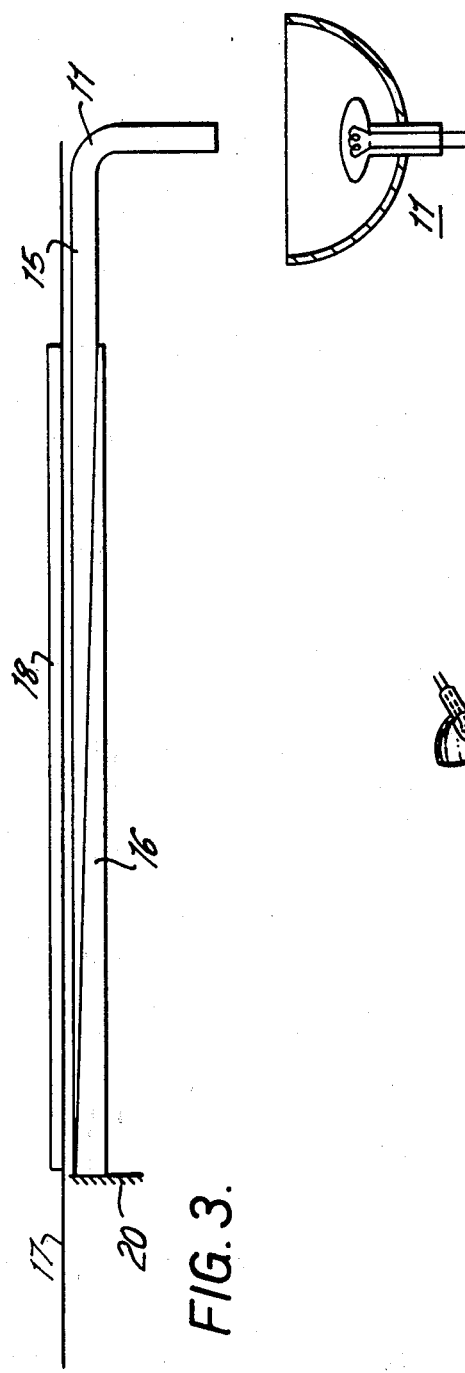
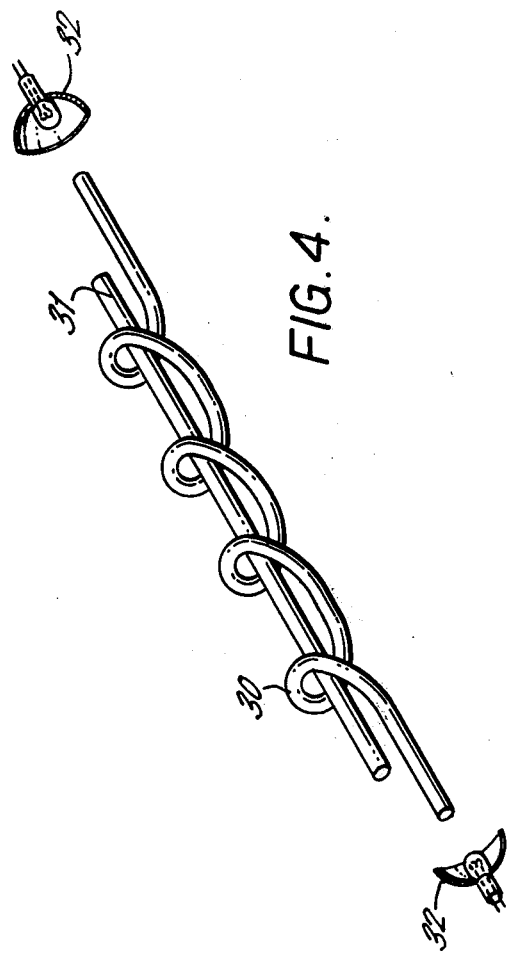
FIG. 3.
FIG. 4.

ILLUMINATOR

The invention relates to illuminators particularly although not exclusively for use in office copiers.

According to the invention there is provided an illuminator for illuminating an object comprising transparent dielectric channel means along which light energy can be transmitted from source means and surface means remote from said source means in intimate contact with the outer surface of a channel means to deflect light energy being transmitted along said channel means out of said channel means towards the object.

Illuminators according to the invention will now be described by way of example with reference to the accompanying schematic drawings in which:

FIG. 1 shows an illuminator for use in an office copier;

FIG. 2 shows enlarged Section A—A of FIG. 1;

FIG. 3 shows another form of an illuminator similar to the illuminator of FIG. 1;

FIG. 4 shows an illuminator comprising laser pumping device; and

Figure 5:
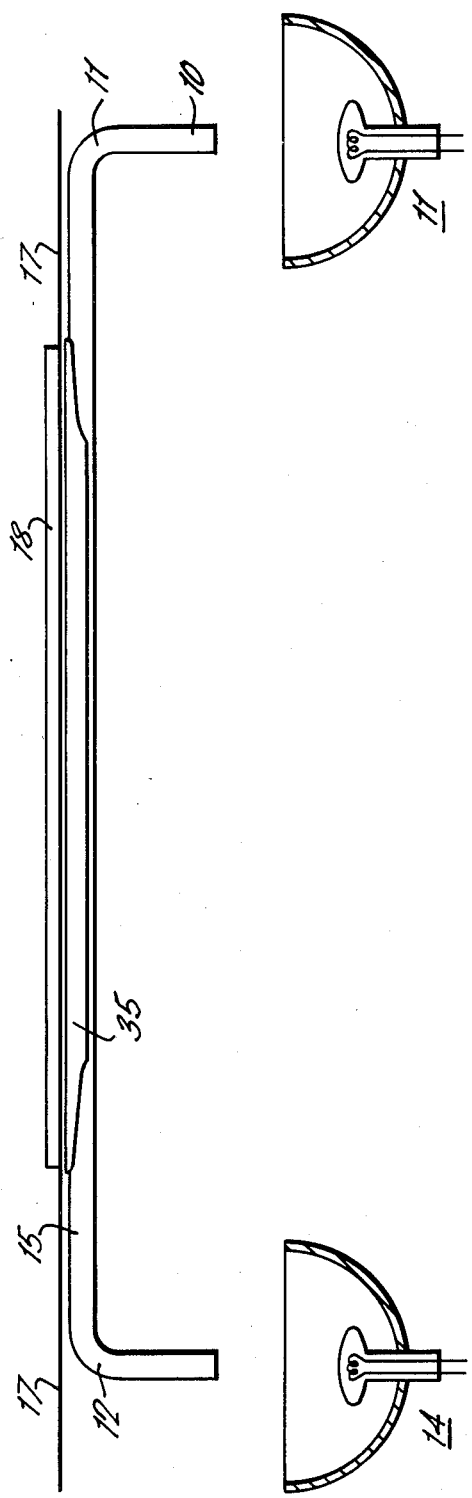
FIG. 5 shows an illuminator generally as in FIG. 1 and having a transparent surface means.

Referring to FIG. 1, a glass rod 10 extends from a first light source 11 through two 90° curved bends 12 and 13 to a second light source 14. A portion 15 of rod 10 between the curves 12 and 13 is coated on its outer surface with a diffuse layer 16 of white paint. Above the portion 15 a platen 17 of a copier (not shown) supports a document 18 to be illuminated during copying.

In FIG. 2 the layer 16 is shown extending around an arc of about 270° of the portion 15 of the glass rod 10. The layer 16 is contoured as best seen in FIG. 1 to provide generally even light distribution across the width of the document 18.

The light sources 11 and 14 each comprise a lamp mounted within a respective concave reflector to direct light energy into respective ends of the glass rod 10. The light energy is transmitted along the glass rod 10 towards the portion 15 by total internal reflection and around the curves 12 and 13. However, light energy which strikes the coating or layer 16 is not totally internally reflected but scattered so as to be deflected directly or indirectly out of the rod 10 towards the document 18.

In light conduits such as the glass rod 10, most of the light being transmitted along the rod 10 intermittently strikes the outer surface of the rod 10. Thus, it follows that most of the light being transmitted along the rod 10 is deflected by the action of the layer 16 towards the document 18.

The arrangement described thus provides an efficient 'strip' light particularly suitable for illuminating a document in a copier. The contour of the coating layer 16 is readily adjustable being applied here by deposition of paint onto the outer surface of the rod 10. This enables illumination of the document 18, or any other object, to be controlled along the length of the portion 15. Normally, it is assumed that in copiers an even distribution of light will be required. However, where optical components, lenses for example, in the system require for compensation more illumination at their outer field of view, the document to be copied could be easily provided using the illuminator described above with greater intensity of illumination at its extreme edges.

Using an illuminator as described the light sources are remote from the point of illumination of the document. This can provide two advantages. Normally strip light sources have to be substantially wider than the document to be copied. With the illuminator described this is no longer necessary and any copier could be made generally having less overall width than before. Also, as the light source or sources can be positioned remote from the point of the illuminator such considerations as mounting, supply terminals and cooling of the light source are simplified. In one arrangement in a cooler for example, the glass rod 10 is mounted to scan the length of the document 18 during a copying cycle and we arrange for the light sources 11 and 14 to remain stationary, the portion 15 of the rod following throughout the scanning.

In some copier machines, especially where the original document is supported on an arced platen, this example of arced scanning is preferred. However, where non-arced scanning is required, and for other non-scanning configuration as well, the rod 10 may be formed at least in part of flexible material. This enables, in a scanning configuration, for example, the portion 15 to scan along a planar path with the light source or light sources held stationary. The same scanning is possible with other forms of strip light such as fluorescent lamps but the light source or lamp itself must be substantially more robust than light sources in the above mentioned arrangements where the light sources remain stationary.

In other words embodiment, FIG. 3, only one light source 11 is provided. The rod 10 extends from the source round the curve 13 and terminates at a flat mirror 20. The contour of the layer 16, in FIG. 5, is different from that of layer 16 in FIG. 1 but provides as before a substantially even intensity of illumination across the width of a document 18. The principle of operation is as described above, the layer 16 scattering the light which is transmitted along the glass rod 10 from the source 11 both before and after the light strikes the mirror 20.

An illuminator according to the invention can also be used as a laser pumping device as illustrated in FIG. 4. In this arrangement a spiral rod 30 surrounds the lasing rod 31 and is suppled with light energy from one or, as in the case shown, two zenon lamps 32. The rod is painted on its outer surface opposite the rod 31 to deflect light energy (in the manner described above) towards the rod 31.

Suitable paints for the surface 16 include Nextel (Trade Mark) supplied by Eastman Kodak Company and Velvet White supplied by Minnesota Mining and Manufacturing Company. The surface 16 may be formed of specular material if desired. Generally, however, specular materials tend to consist of metallic materials which cause in themselves energy loss due to absorption. Such inherent losses must be considered as a factor in determining the most satisfactory materials to be used for the illuminator.

In the arrangements so far described the light is deflected out of the rod 10 by reflection from the layer of paint such as layer 16. In other arrangements we provide layers of transparent material having a refractive index greater than the refractive index of the conduit rod 10.

In one such arrangement, in FIG. 5, the illuminator is generally as shown in FIG. 1. However, the surface 16 is replaced by a surface layer 35 of glass material. The surface layer 35 is adjacent the platen 17 and deflects light out of the rod 10, through the surface layer 35, towards the document 18. In this example the surface layer 35 is contoured to control the illumination along the length of the portion 15 as desired. Similar control could be alternatively or additionally achieved by shaping the layer by varying the thickness of the surface layer 35 along its length.

The material of the layer 35 depends essentially on the material chosen for the light conduit rod 10. The layer 35 must have a refractive index greater than the refractive index of the light conduit rod.

In general we prefer to use a reflecting surface 16 such as shown in FIG. 1 rather than a transparent surface layer shown in FIG. 5 because we can present form and more easily provide a more efficient system with materials available using reflecting surfaces such as in FIGS. 1 to 4.

As will be appreciated the rod may be formed of any glass or plastics material in accordance with established practice. Normal transmission of light, in rods or other channel means, including infra-red and ultra-violet light, is well understood and selection of material and refractive indices for this purpose is dependent on the use and mean wavelengths of light to be used. For example, the maximum angle of curvature of the curves 12 and 13 say depends on the diameter of the rod, or cross-sectional area of other shaped channel means, to be used, the refractive index of the materials and the wavelength of the light ensuring the critical angles of internal reflection for the whole spectrum of the light are not exceeded. In practice a margin of error is usually built into the design of the system.

Various glass materials such as flint glass and crown glass or plastics materials may be used for the light channel means. All materials must be transparent at least to the wavelengths of the light desired to be transmitted by the system. In one configuration we use a glass rod formed of glass of refractive index of 1.52 and painted with Nextel (Trade Mark) paint, of configuration as described with reference to FIG. 1.

An important consideration not specifically mentioned or described is that the channel means such as the rod 10 must preferably be supported by materials of low refractive index. In practice, we prefer to provide clamping or supporting means (not shown) which consist of gripping means formed of material of refractive index of at least 0.20 say less than the refractive index of the channel means. If the refractive index of the gripping means is greater, then the light is scattered at the area of gripping, generally as light is scattered in the configuration of FIG. 5, and so reduces the efficiency of the system. Likewise if the area of gripping is at least to some extent diffusing or specular then leakage of light energy from the system at the supporting means takes place. Thus, where maximum transmission of light is required along the channel means we arrange as far as possible that all clamping or supporting means (or any other point where the channel means contacts another surface) are formed with contact surfaces of material of lower refractive index than the light channel means.

While a particular embodiment of the invention has been described above, it will be appreciated that various modifications may be made by one skilled in the art without departing from the scope of the invention as defined in the appended claims.

What is claimed is:

1. In a copier machine having optical components for projecting the image of an object on a platen and an illuminator for providing a predetermined illumination of the object, the combination comprising
    a light source;
    a light conducting rod having a first portion with an end disposed adjacent the light source and effective to transmit light from the source along the rod by means of multiple internal reflections therealong and a second portion curved with respect to the first portion and disposed in relation to the platen for illumination of an object supported thereon;
    a surface layer of transparent material supported on the second portion of the rod to effect transmission of light from the inside to the outside of the rod and being contoured to control the intensity of illumination along the second portion of the rod onto the object, the surface layer of transparent material having a refractive index greater than the refractive index of the light conducting rod.

2. The illuminator of claim 1, wherein the light source is stationary and the light conducting rod is mounted to scan the length of a document during a copying cycle.

* * * * *